US008402008B2

(12) United States Patent
Adkins et al.

(10) Patent No.: US 8,402,008 B2
(45) Date of Patent: Mar. 19, 2013

(54) HANDLING FILE OPERATIONS WITH LOW PERSISTENT STORAGE SPACE

(75) Inventors: Janet E. Adkins, Austin, TX (US); Matthew T. Brandyberry, Austin, TX (US); David J. Craft, Wimberly, TX (US); Manoj N. Kumar, Austin, TX (US); Andrew N. Solomon, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 141 days.

(21) Appl. No.: 12/879,887

(22) Filed: Sep. 10, 2010

(65) Prior Publication Data

US 2012/0066190 A1     Mar. 15, 2012

(51) Int. Cl.
*G06F 7/00* (2006.01)
*G06F 17/00* (2006.01)

(52) U.S. Cl. ......................... 707/703; 711/155
(58) Field of Classification Search .......... 707/662–666, 707/689, 703–704; 711/113, 155, 161–162; 714/6.3

See application file for complete search history.

(56) References Cited

U.S. PATENT DOCUMENTS

| | | | | |
|---|---|---|---|---|
| 6,952,758 | B2 * | 10/2005 | Chron et al. ................... | 711/162 |
| 7,237,080 | B2 * | 6/2007 | Green et al. ................... | 711/162 |
| 7,526,623 | B1 * | 4/2009 | Rao ............................... | 711/162 |
| 7,856,423 | B1 * | 12/2010 | Revsin .......................... | 707/640 |
| 2006/0107006 | A1 * | 5/2006 | Green et al. ................... | 711/162 |

OTHER PUBLICATIONS

Helary et al., Communication-induced determination of consistent snapshots, 1999, vol. 10, IEEE, 865-877.*
Garimella, Neeta, "Understanding and exploiting snapshot technology for data protection, Part 1: Snapshot technology overview", *TSM Client Developer, Tivoli—Software Group, IBM* http://www.ibm.com/developerworks/tivoli/library/t-snaptsm1/index.html Obtained from internet on Sep. 6, 2010. Apr. 26, 2006, 9 pages.
Shah, Bhavana, "Disk Performance of Copy-On-Write Snapshot Logical Volumes", B.E., Indian Institue of Technology Roorkee, India, 1999 *The University of British Columbia*, Aug. 2006 http://www.cs.ubc.ca/grads/resources/thesis/Nov06/Bhavana.pdf Obtained from Internet on Sep. 6, 2010. Aug. 2006, 83 pages.

* cited by examiner

*Primary Examiner* — Jean B Fleurantin
(74) *Attorney, Agent, or Firm* — DeLizio Gilliam, PLLC

(57) ABSTRACT

In some embodiments, a file management unit located in the operating system detects a write operation that writes the data blocks within the consistency snapshot (in main memory) to the persistent storage. The file management unit can then determine that all transactions have been completed before the write operation begins. In some instances, the file management unit then attempts to write the data blocks within the consistency snapshot to the persistent storage. The file management unit can then receive a notification that the write operation did not successfully write the data blocks from the consistency snapshot to the persistent storage. In some embodiments, the write operation is not successful because there are fewer free data blocks in the persistent storage than needed for writing the data blocks within the consistency snapshot to persistent storage. The file management can then wait a period of time. After the file management unit has waited for a period of time, it can make another attempt to write the data blocks within the consistency snapshot to the persistent storage.

17 Claims, 5 Drawing Sheets

HANDLING FILE OPERATIONS WITH LOW PERSISTENT STORAGE SPACE

TECHNICAL FIELD

Embodiments of the inventive subject matter generally relate to the field of operating systems, and more particularly, to handling file operations in operating systems.

BACKGROUND

Operating systems are a basic component in most computer systems. Operating systems include file systems, which organize and store data within main memory and on disk (or other persistent storage). An operating system manages data in the file system with various system operations, such as operations which read and write the data in the file system. Redirect-on-write file systems can temporarily store the results of system operations in main memory for a short period of time before writing the results of the system operations to a disk. When there is a limited amount of available space on the disk, problems can arise when the temporary results in main memory are transferred to the disk.

SUMMARY

In some embodiments, a file management unit located in the operating system detects a write operation that writes the data blocks within the consistency snapshot (in main memory) to the persistent storage. The file management unit can then determine that all transactions have been completed before the write operation begins. In some instances, the file management unit then attempts to write the data blocks within the consistency snapshot to the persistent storage. The file management unit can then receive a notification that the write operation did not successfully write the data blocks from the consistency snapshot to the persistent storage. In some embodiments, the write operation is not successful because there are fewer free data blocks in the persistent storage than needed for writing the data blocks within the consistency snapshot to persistent storage. The file management can then wait a period of time. After the file management unit has waited for a period of time, it can make another attempt to write the data blocks within the consistency snapshot to the persistent storage.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
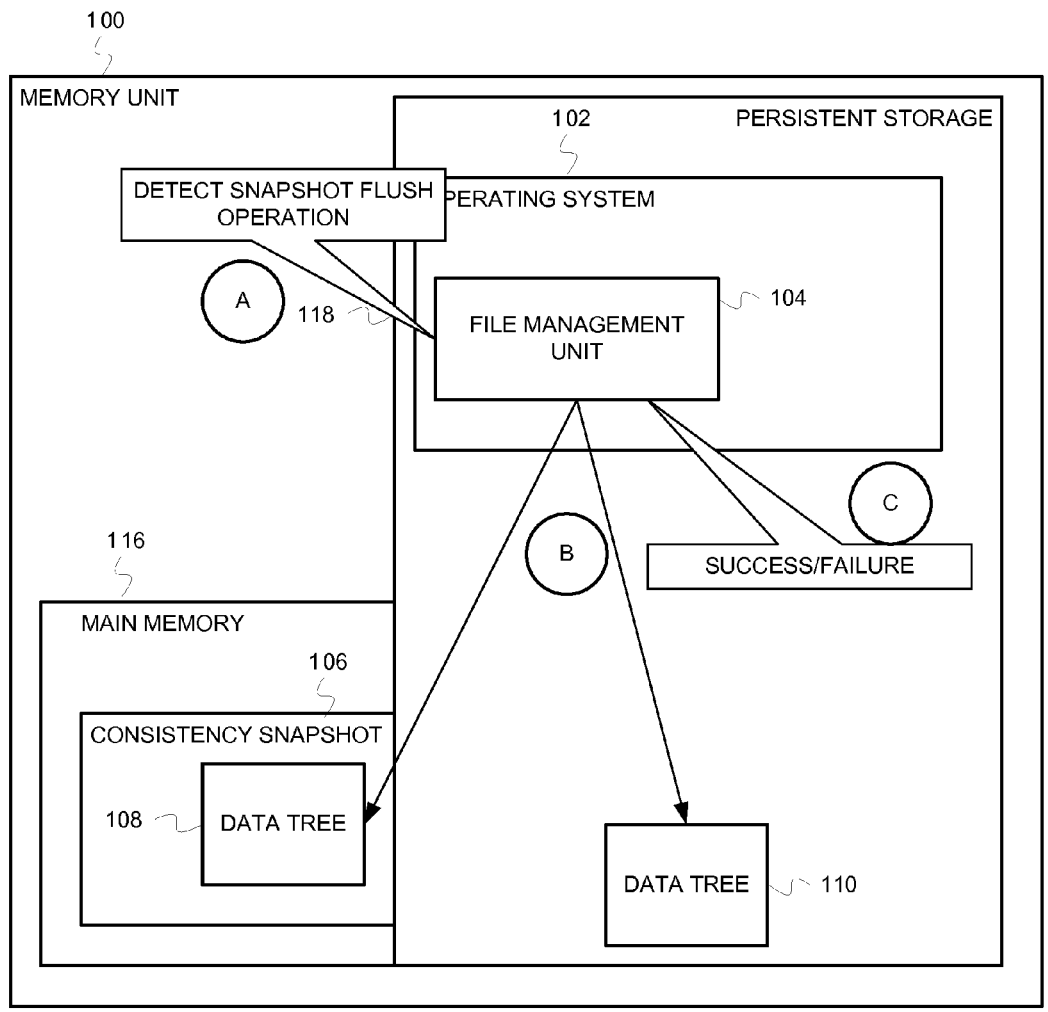
FIG. 1 is an example conceptual diagram illustrating operations for handling overcommitted redirect-on-write file systems.

The description that follows includes exemplary systems, methods, techniques, instruction sequences and computer program products that embody techniques of the present inventive subject matter. However, it is understood that the described embodiments may be practiced without these specific details. For instance, although examples refer to handling an overcommitted system state in an IBM® Advanced Interactive Executive (AIX®) operating system, in other embodiments, operations described herein can also be implemented for removing files in any suitable operating system. In other instances, well-known instruction instances, protocols, structures and techniques have not been shown in detail in order not to obfuscate the description.

Introduction

This section provides an introduction to concepts utilized in some embodiments of the inventive subject matter.

Some operating systems store and organize their data in file systems. These file systems may store and organize data and files using different methods and data structures. The data in the file systems can be stored in persistent storage (e.g., on magnetic disk). Data in persistent storage can be referred to as an original volume.

Some operating systems ensure data redundancy and minimize the impact of system crashes by utilizing certain data consistency methods in their file systems. Data consistency is the concept that data should be valid and accurate. If a computer system loses power, crashes, or fails, data consistency prevents the data from becoming unrecoverable or corrupted.

Operating systems can maintain data consistency using consistency snapshots. A consistency snapshot (also referred to herein as a "snapshot") is a record of a file system's state at a given moment in time. Upon creation, snapshots are stored in main memory, but later, they are written to persistent storage. Because snapshots are eventually stored in persistent storage (e.g., on magnetic disk), operating system components can use snapshots as a guide for restoring file systems after components fail (e.g., a loss of power).

Some embodiments of the inventive subject matter include operating systems that employ redirect-on-write file systems. In some embodiments, the redirect-on-write file system's original volume contains file data present when a snapshot is written to persistent storage. The file system can also store, in a snapshot storage area in main memory, modifications to the original volume, where the modifications occurred since the snapshot was taken. Consequently, in some embodiments, redirect-on-write file systems redirect new write operations affecting the original volume to the snapshot's storage area in main memory. For example, if an application program wants to modify an existing file by writing new data to the file, the file system records the new data in the snapshot's storage area in main memory.

In some embodiments, the redirect-on-write file system includes a file management unit that manages the flow of file data between the snapshot storage area of main memory and persistent storage. Periodically, the file management unit can determine that the file data from the snapshot storage should be reconciled back into the original volume (this process is also referred to herein as "flushing the snapshot" to persistent storage). After reconciling the snapshot back into the original volume, the original volume is up-to-date, and the file management unit can then create another snapshot. As successive snapshots are created, access to the original file data, tracking of the file data in the snapshots and the original volume, and reconciliation upon snapshot deletion are further complicated. As these issues grow in complexity with each successive snapshot, the file management unit can track and reconcile the file data modifications in the snapshot and the original volume.

There are relationships between consecutive snapshots in redirect-on-write file systems. As discussed above, a new snapshot is captured in main memory after the previous snapshot is written to persistent storage. At this point in time, the original volume is up-to-date, so the data in the original volume represents the current state of the file system. Embodiment can flush the snapshot to persistent storage periodically (e.g., every 5 seconds), on demand, or in any other suitable fashion.

The persistent storage area can store the file data in data blocks. These data blocks can be connected in structures called i-nodes, which can store basic information about files and directories. The data blocks can be connected in a tree structure, with the top data block referred to as a disk i-node block. The disk i-node block can be connected with up to sixteen indirect data blocks below. The indirect data blocks can also be connected with up to sixteen indirect data blocks below or up to sixteen data blocks (also referred to herein as "direct data blocks"). The data blocks can store data, while the indirect data blocks provide access to the data blocks. The hierarchical structure of the indirect data blocks and data blocks form files and directories. The file structure is further described in FIG. 2. After the file management unit reconciles the current snapshot into the original volume (in persistent storage), the data blocks freed during the consistency snapshot become available, so the next snapshot can utilize the free data blocks in persistent storage.

Data blocks in main memory and persistent storage can be managed with file transactions, which are sets of operations that are linked together as a single, indivisible file operation. The use of file transactions ensures that either all of the steps (operations) in a file transaction are completed without error, or none of the steps in the file transaction are completed. In some instances, a file transaction successfully completes a portion of the operations, but later receives an error while attempting to complete other operations. Whenever operations in a transaction return an error, then all of the operations in the file transaction must fail. At this point, the system will return to its state before the file transaction began by undoing all operations within the transaction whether the individual operations were completed successfully or not. If all of the operations within a file transaction are completed successfully, then the operations are all recorded (i.e., committed) in the system.

There are various complexities to redirect-on-write file systems. For instance, removing data or files operates differently in redirect-on-write file systems than with other file systems. With other file systems, data or files can typically be removed freely without regard for remaining disk space in storage. However, with redirect-on-write file systems, a limited amount of free data blocks in persistent storage can be problematic. When the persistent storage does not have enough free data blocks to complete system calls, such as file removal or write operations, the system calls can fail. In order to detect when persistent storage is low on free data blocks, the system can utilize an indicator that signals there are either a small number of free data blocks remaining, or there are no free data blocks left remaining in the persistent storage. The system can also use this indicator to determine that the number of data blocks stored in the consistency snapshot in main memory is greater than the number of free data blocks in persistent storage (this state is referred to as being "overcommitted"). Whenever the system is overcommitted, data blocks must be freed in persistent storage or the storage pool for persistent storage must be expanded before the consistency snapshot can be flushed to persistent storage.

Handling Overcommits in a Redirect-on-Write File Systems

FIG. 1 is a conceptual diagram illustrating example operations for handling overcommitted redirect-on-write file systems. FIG. 1 depicts a computer system 100 that includes main memory 116 and persistent storage 118. In some embodiments, main memory 116 includes a consistency snapshot 106. The data within the consistency snapshot 106 are organized in a data tree 108. The contents of the data tree 108 are further described in FIG. 2.

Within persistent storage 118, there can be an operating system 102 (e.g., IBM AIX operating system). The operating system 102 includes a file management unit 104, which in some embodiments manages committing (writing) both data and files located in the data tree 108 in the consistency snapshot 106 to a separate data tree 110 in persistent storage 106. Although FIG. 1 shows the operating system 102 in persistent storage 118, portions of the operating system can also reside in main memory.

In some embodiments, the file management unit 104 detects a snapshot flush operation (depicted in diagram as operation "A"). In some instances, the operating system 102 flushes the consistency snapshot to disk every five seconds. If there are no file transactions that are in-process but incomplete, the file management unit 104 can flush the consistency snapshot 106 to persistent storage by writing the data tree 108 residing in the consistency snapshot 106 to the data tree 110 located in persistent storage 118 (depicted in diagram as operation "B"). The file management unit 104 can detect whether the write operation succeeded or failed (depicted in diagram as operation "C"). The write operation may fail because the persistent storage 118 does not have enough free data blocks to complete the write operation. If the file management unit 104 detects that the write operation failed, the file management unit 104 can wait for a period of time before making another attempt to flush the data tree 108 in the consistency snapshot 106 to persistent storage 118. By waiting until later to flush consistency snapshot, the file management unit 104 maintains consistency of file data, and avoids problems that would arise from a consistency snapshot that requires more storage space than what is available in persistent storage (i.e., the overcommitted state).

Figure 2:
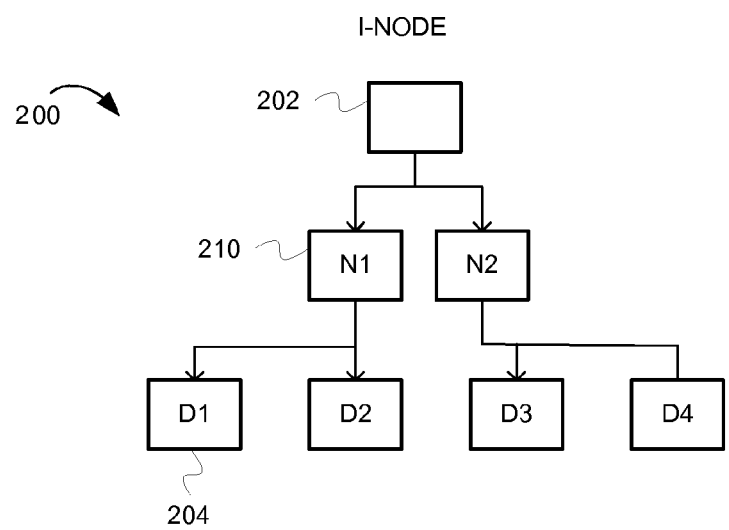
FIG. 2 is an example which illustrates the contents of the file structures involved in redirect-on-write file system.

FIG. 2 is a diagram which illustrates an example of how file data can be stored in persistent storage. In FIG. 2, an i-node includes a series of indirect data blocks 210 and data blocks 204 connected to a disk i-node block 202 in a hierarchical manner. The disk i-node block 202 is the head of the data tree, which stores all of the data. In some embodiments, the disk i-node block contains up to sixteen pointers to indirect data blocks 210 below. Each indirect data block 210 can also contain up to sixty-four pointers to data blocks 204 below. All of the data can be stored in data blocks 204 at the bottom level of the data tree, while the indirect data blocks 210 can contain the pathway information necessary to access the data blocks 204. In some instances, there are indirect data blocks 210 in the i-node which connect to other indirect data blocks 210. This allows for the file structure to contain more data blocks, thereby increasing the amount of data which can be stored within a single file structure.

Figure 3:
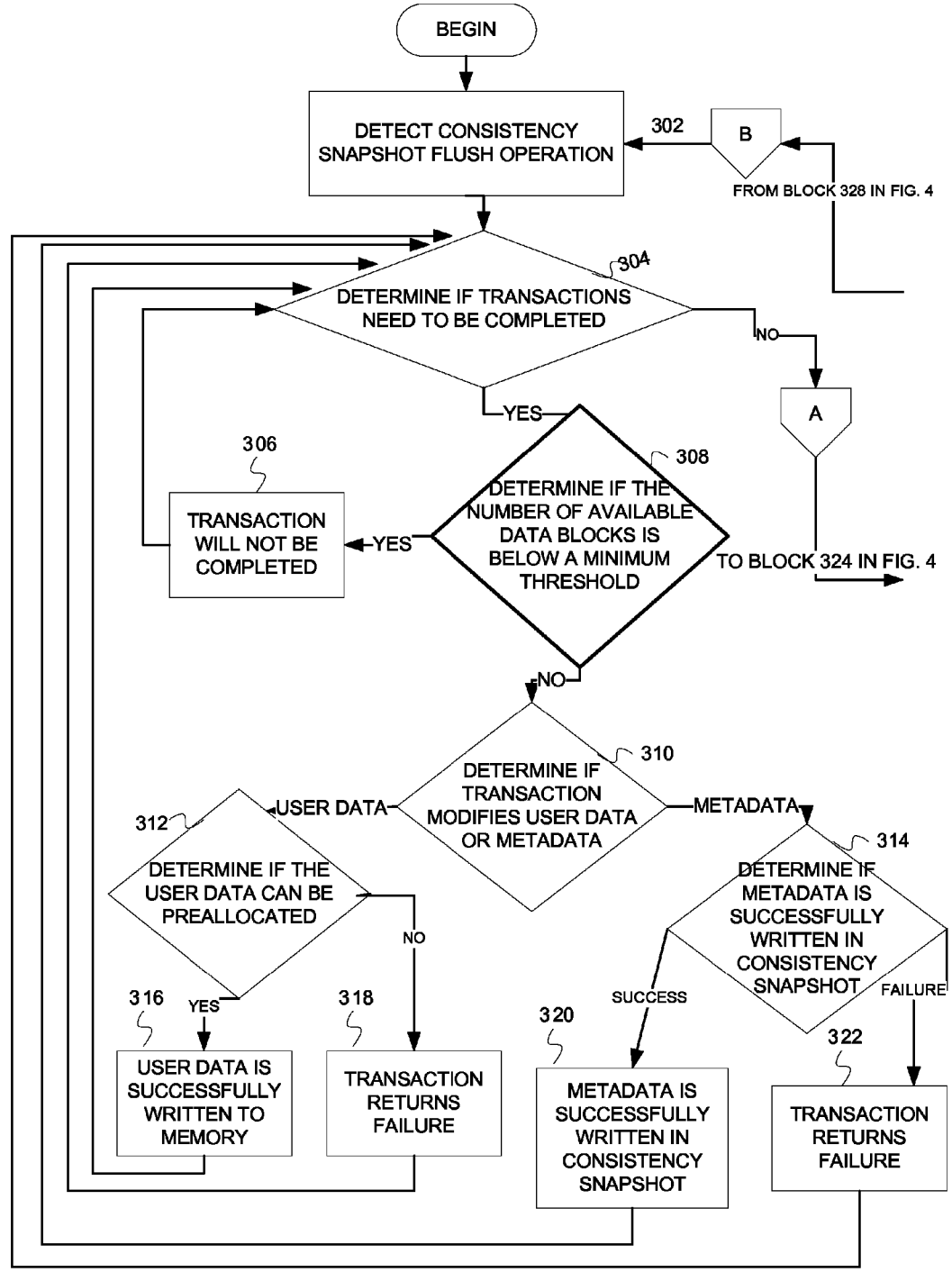
FIG. 3 depicts a flow diagram illustrating example operations for handling overcommitted redirect-on-write file systems.
Figure 4:
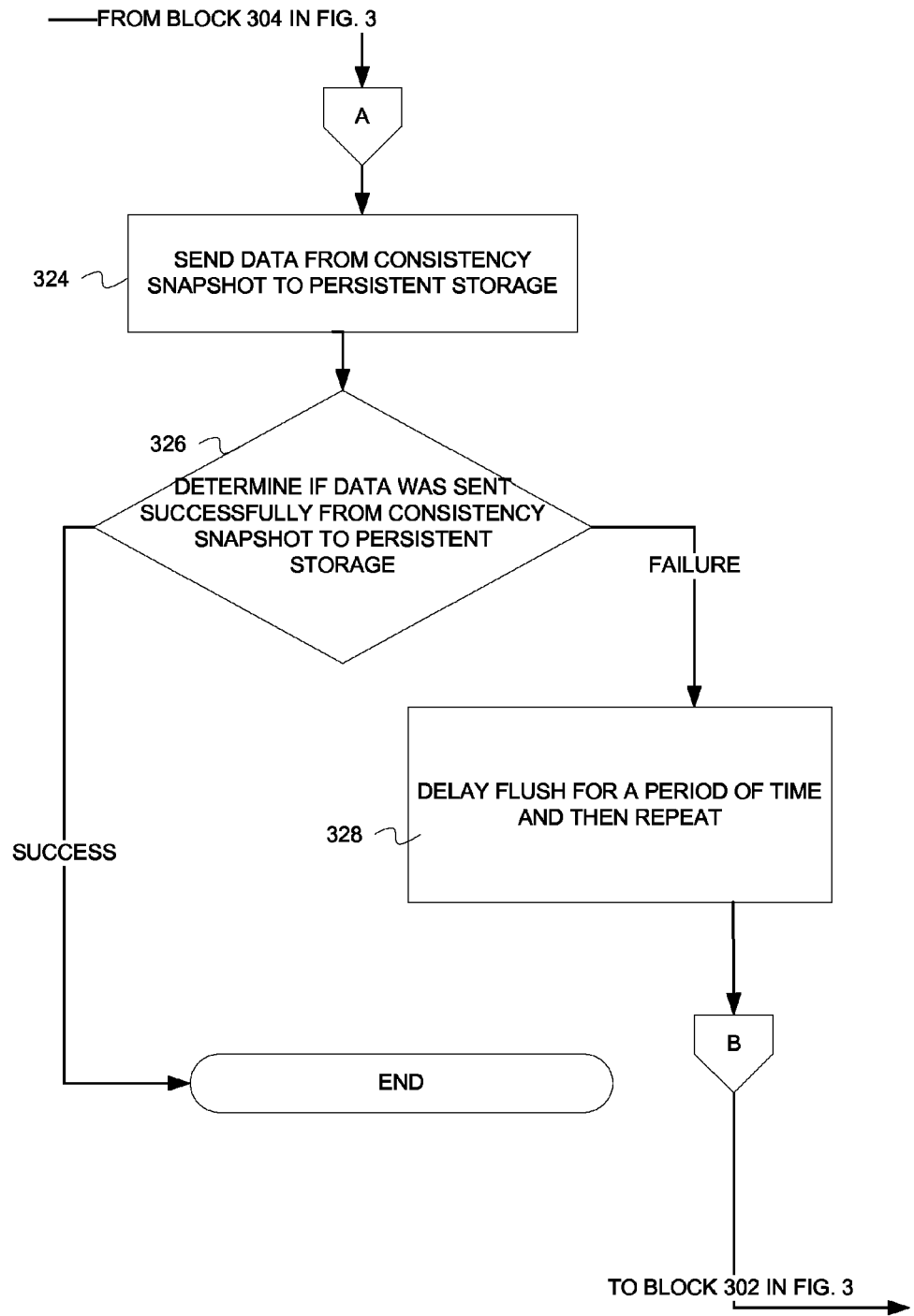
FIG. 4 is a continuation of FIG. 3 and also depicts a flow diagram illustrating example operations for handling overcommitted redirect-on-write file systems.

This discussion continues with a description of operations performed by some embodiments of the invention FIG. 3 and FIG. 4 depict a flow diagram illustrating example operations for handling overcommitted redirect-on-write file systems.

The operations in FIGS. 3 and 4 work together to form one operational flow. In FIG. 3, the operations describe how some embodiments must complete all file transactions before flushing a consistency snapshot to persistent storage. After all in-flight file transactions are complete, the flow moves to FIG. 4, where the operations explain how some embodiments delay flushing the snapshot to persistent storage. By delaying the flush, the operating system can maintain file data consistency while avoiding issues with low persistent storage space.

In FIG. 3, the flow begins at block 302. In some embodiments, the file management unit detects a consistency snapshot flush operation (302). The operating system may flush the consistency snapshot to persistent storage every five seconds; it can also flush the snapshot based on other time periods and/or events.

Next, the file management unit can determine whether there are incomplete file transactions that must complete before the flush operation commences (304). As noted above, file transactions are atomic, so they must complete before being interrupted by a consistency snapshot flush. Next, if there are incomplete file transactions that must complete, the file management unit determines whether the number of available data blocks in persistent storage is below a minimum threshold (308). If the number of available data blocks in persistent storage is below a minimum threshold, then the transactions may not be completed (306). From here, the process repeats (goes back to 304) until more data blocks are freed in persistent storage. Data blocks can be freed by either removing files, or adding storage capacity to persistent storage.

If the number of available data blocks in persistent storage is not below a minimum threshold (308), then the file management unit determines if the incomplete transaction modifies user data or metadata (310). User data includes data blocks that are used by user application programs, etc. Metadata includes data needed by the operating system to manage files. In some instances metadata includes data about file pathway information (e.g., pointers) for other data blocks in memory or persistent storage.

If the file management unit determines that a transaction modifies user data (at 310), then the file management unit can then determine if the user data can be pre-allocated in persistent storage (312). In some instances, persistent storage has enough available data blocks to allow for the pre-allocation of the user data. The transaction can then be completed successfully (316) (i.e., successfully written to the consistency snapshot in main memory), and the process returns (to block 304) to determine if other transactions need to be completed. However, if persistent storage does not have enough available data blocks to allow for pre-allocation of user data in persistent storage, then the transaction can return failure (318). At this point, the process returns (to block 304) to determine if there are other incomplete transactions that need complete. Any transaction that fails must be completed before the process can progress to handling the consistency snapshot flush operation (i.e., before the process proceeds on the "no" path from 304).

In some instances, the file management unit determines (at 310) that a transaction modifies metadata. If the transaction does not write the metadata to the consistency snapshot successfully (322), then the transaction returns failure and the system returns to block (304). However, if the metadata is successfully written in the consistency snapshot in main memory (314), the consistency snapshot is updated with the metadata (320), and the process returns to block (304) to determine if other transactions need to be completed.

After all of the transactions have been completed, the system can send the data blocks from the consistency snapshot to persistent storage (324). The data blocks can be written (committed) from the consistency snapshot to the appropriate locations in persistent storage. In some instances, the file management unit retrieves the data in the consistency snapshot beginning with the deepest (or bottom) data blocks in the data tree in the consistency snapshot (e.g., see FIG. 2). Once the deepest data blocks are copied from the consistency snapshot to persistent storage, then the next deepest data blocks can be written to persistent storage. This bottom to top data copy process can continue until all of the data blocks from the consistency snapshot have been written successfully to persistent storage. If any write operation to persistent storage fails, then the flushing operation will be aborted and the commit fails. The file management unit can then wait for a period of time before attempting the flush operation again.

If the file management unit determines that the data was sent successfully from the consistency snapshot in main memory to persistent storage 326, then the flush operation is complete and successfully committed. However, if the file management unit determines that the data was not sent successfully from the consistency snapshot to persistent storage, then the system can delay the flush operation for a period of time 328. In some instances, there are not enough free data blocks in persistent storage to store all of the data in the consistency snapshot. The system can then return to block 302. The file management unit can then wait until the next flush operation is detected. While the file management unit is waiting for another flush operation, the number of used data blocks in the consistency snapshot may continue to grow. In some instances, the data blocks in the consistency snapshot may not be written to persistent storage until the number of free data blocks in persistent storage is greater than the number of data blocks in use in the consistency snapshot. The number of available data blocks in persistent storage can increase through file removal or adding additional data storage (e.g., disk space) to persistent storage.

Delaying the consistency snapshot flush operation enables the operating system to tolerate errors that would arise from not having enough persistent storage space to write the consistency snapshot from main memory to persistent storage (e.g., a disk temporarily disconnected from the computer system). Because the operating system can store the file transactions in the consistency snapshot in main memory, the operating system can keep track of all file operations even though it cannot write the consistency snapshot to persistent storage. Thus, in some embodiments, the operating system maintains a consistent state of its file system—part in main memory and part in persistent storage.

It should be understood that FIGS. 1-5 are examples meant to aid in understanding embodiments and should not be used to limit embodiments or limit scope of the claims. Embodiments may perform additional operations, fewer operations, operations in a different order, operations in parallel, and some operations differently. For instance, according to FIG. 3, the file management unit determines if the number of available data blocks in persistent storage is below a minimum threshold before determining if a transaction modifies user data or metadata. In some embodiments, the file management unit may determine if a transaction modifies user data or metadata before determining if the number of available data blocks in persistent storage is below a minimum threshold.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
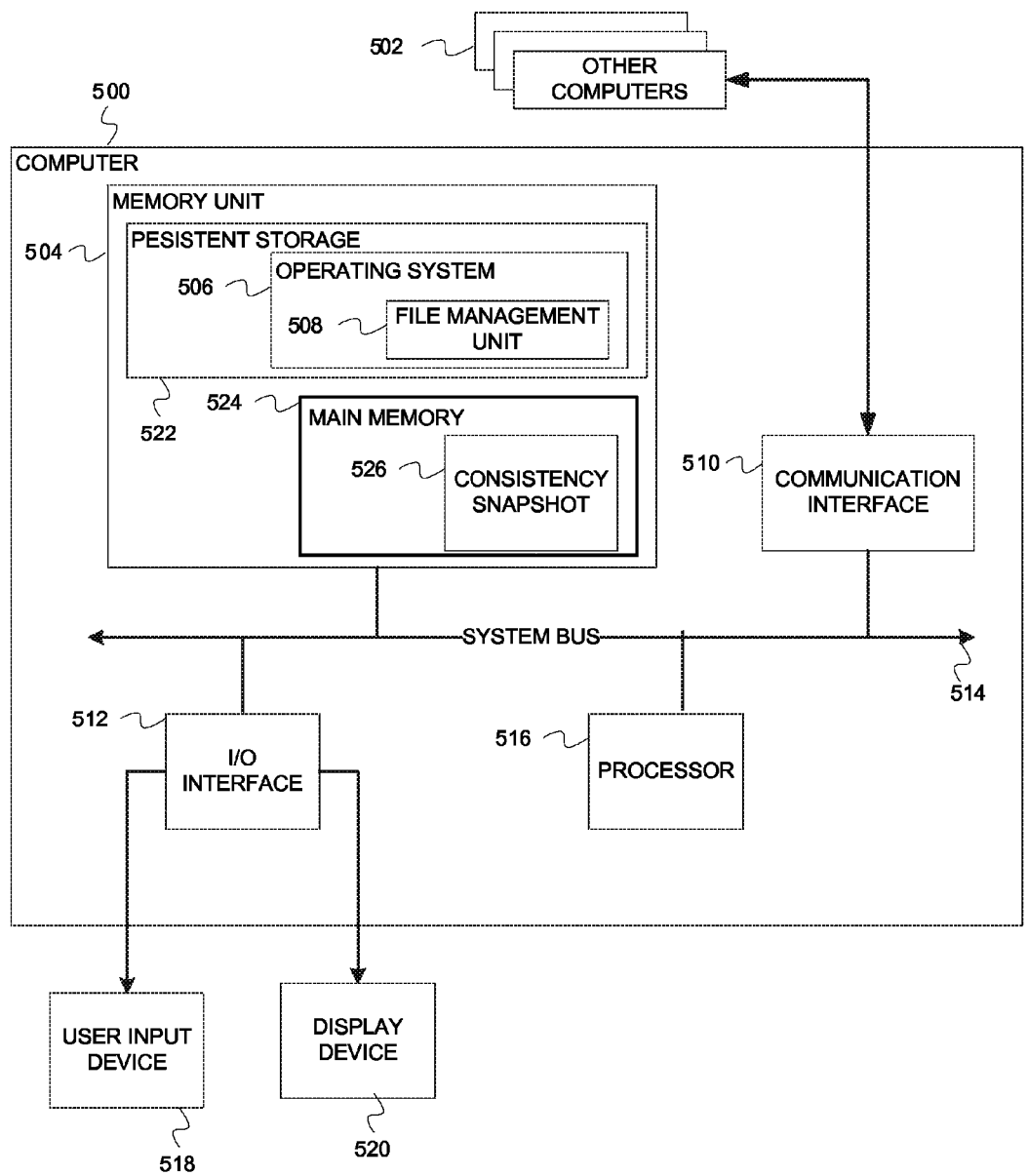
FIG. 5 is a block diagram of one embodiment of a computer system.

FIG. 5 depicts an example computer system. A computer system includes a processor 516 (possibly including multiple processors, multiple cores, multiple nodes, and/or implementing multi-threading, etc.). The computer system includes a memory unit 504. The memory unit 504 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a system bus 514 (e.g., PCI, ISA, PCI-Express, HyperTransport®, InfiniBand®, NuBus, etc.), a communication interface 510 (e.g., an ATM interface, an Ethernet interface, a Frame Relay interface, SONET interface, wireless interface, etc.), and an I/O (input/output) interface 512. The communication interface allows the computer 500 to communicate (e.g., send and receive data) with other computers 502. Input/output interface adapters in computers can implement user-oriented input/output through, for example, software drivers and computer hardware. The I/O interface may utilize various display devices 520, such as computer display screens, and various user input devices 518, such as keyboards and mice.

The memory unit 504 embodies functionality to implement embodiments described above. The memory unit 504 may include one or more functionalities that facilitate handling overcommitted redirect-on-write file systems. In some embodiments, the memory unit 504 includes main memory 524, which can include a consistency snapshot 526. As discussed above, the consistency snapshot 526 can include data for files located in persistent storage 522. The memory unit 504 also includes an operating system 506 located in persistent storage 522. In some embodiments, there is a file management unit 508 located in the operating system 506. The file management unit 508 embodies functionality to implement embodiments described above. The file management unit 508 may include one or more functionalities that facilitate the handling of an overcommitted redirect-on-write file system. In some embodiments, the file management unit 508 detects a flush operation. Then, the file management unit 508 can determine that data and files in the consistency snapshot 526 were not written successfully to persistent storage 522. As discussed above, the file management unit 508 can then delay the flush operation and wait before attempting the flush operation again.

Any one of these functionalities may be partially (or entirely) implemented in hardware and/or on the processor 516. For example, the functionality may be implemented with an application specific integrated circuit, in logic implemented in the processor 516, in a co-processor on a peripheral device or card, etc. Further, realizations may include fewer or additional components not illustrated in FIG. 5 (e.g., video cards, audio cards, additional network interfaces, peripheral devices, etc.). The processor 516, the I/O interface 512, and the communication interface 510 are coupled to the system bus 514. Although illustrated as being coupled to the system bus 514, the memory unit 504 may be coupled to the processor 516.

While the embodiments are described with reference to various implementations and exploitations, it will be understood that these embodiments are illustrative and that the scope of the inventive subject matter is not limited to them. In general, techniques for handling overcommitted redirect-on-write file systems as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method of writing, within a redirect-on-write file system residing in a computer system, a plurality of data blocks within a consistency snapshot in main memory to a persistent storage, the method comprising:
    detecting, in the redirect-on-write file system residing in the computer system, a write operation which writes the plurality of data blocks within the consistency snapshot in main memory to the persistent storage;
    determining that no file transactions need to complete before the plurality of data blocks within the consistency snapshot in main memory are written to persistent storage;
    determining that there are fewer free data blocks in the persistent storage than needed for writing the plurality of data blocks within the consistency snapshot in main memory to the persistent storage;
    waiting a period of time; and
    after the period of time, writing the plurality of data blocks within the consistency snapshot in main memory to the persistent storage.

2. The method of claim 1, wherein the period of time is determined to be of random duration.

3. The method of claim 1, further comprising:
    completing a plurality of file transactions including operations involving metadata related to files.

4. The method of claim 1, further comprising:
    completing a plurality of file transactions, wherein said plurality of transactions include a plurality of operations involving user data.

5. The method of claim 1, further comprising:
    detecting, after the waiting, that the persistent storage includes enough free data blocks to write the consistency snapshot from main memory to persistent storage.

6. The method of claim 1, wherein the period of time is based on waiting for a plurality of free data blocks to become available in the persistent storage.

7. A computer program product for copying, within a redirect-on-write file system, a plurality of data blocks and a plurality of indirect data blocks from a consistency snapshot to a persistent storage, the computer program product comprising:
    a computer readable storage medium having computer usable program code embodied therewith, the computer readable program code configured to,
        detect, in the redirect-on-write file system residing in a memory unit, a write operation that writes both the plurality of data blocks and the plurality of indirect data blocks within the consistency snapshot to the persistent storage;
        determine that a plurality of transactions have completed before the write operation commences;
        attempt to write the plurality of data blocks and the plurality of indirect data blocks within the consistency snapshot to the persistent storage;
        receive a notification that the write operation did not successfully write the plurality of data blocks and the plurality of indirect data blocks to the persistent storage;
        delay the write operation; and
        attempt, after the delay, to write the plurality of the data blocks and the plurality of the indirect data blocks within the consistency snapshot to the persistent storage again.

8. The computer program product of claim 7, wherein the computer readable program code is further configured to:
    generate a random time period, wherein the delay is for a duration of the random time period.

9. The computer program product of claim 7, wherein the computer readable program code is further configured to:
    complete the plurality of transactions, wherein said plurality of transactions are comprised of a plurality of operations involving a plurality of metadata.

10. The computer program product of claim 7 wherein the computer readable program code is further configured to:
    complete the plurality of transactions, wherein said plurality of transactions are comprised of a plurality of steps involving a plurality of user data.

11. The computer program product of claim 7, wherein the computer readable program code configured to delay the write operation is further configured to:
    delay the write operation until free data blocks become available in the persistent storage.

12. An apparatus comprising:
    a processor;
    a memory unit coupled with the processor, wherein the memory unit includes a redirect-on-write operating system, wherein the redirect-on-write operating system includes a file management unit configured to:
        detect, in the redirect-on-write file system residing in a memory unit, a write operation which writes the plurality of data blocks within the consistency snapshot to the persistent storage;
        determine that a plurality of transactions have completed before the write operation commences;
        attempt to write the plurality of data blocks within the consistency snapshot to the persistent storage;

receive a notification that the write operation did not successfully write the data blocks to the persistent storage;

wait a period of time; and after the period of time, attempt to write the plurality of data blocks within the consistency snapshot to the persistent storage.

13. The apparatus of claim 12, wherein the file management unit is further configured to select the period of time to be of random duration.

14. The apparatus of claim 12, wherein the file management unit is further configured to complete the plurality of transactions, wherein said plurality of transactions are comprised of a plurality of operations involving a plurality of metadata.

15. The apparatus of claim 12, wherein the file management unit is further configured to complete the plurality of transactions, wherein said plurality of transactions are comprised of a plurality of operations involving a plurality of user data.

16. The apparatus of claim 12, wherein the file management unit is further configured to wait for the plurality of transactions to be completed.

17. The apparatus of claim 12, wherein the period of time is based on a duration elapsed before a plurality of free data blocks become available in the persistent storage.

* * * * *